United States Patent
Fitzgerald et al.

(10) Patent No.: US 8,418,173 B2
(45) Date of Patent: Apr. 9, 2013

(54) LOCATING AN UNAUTHORIZED VIRTUAL MACHINE AND BYPASSING LOCATOR CODE BY ADJUSTING A BOOT POINTER OF A MANAGED VIRTUAL MACHINE IN AUTHORIZED ENVIRONMENT

(75) Inventors: Joseph Fitzgerald, Franklin Lakes, NJ (US); Oleg Barenboim, Fort Lee, NJ (US); Richard Oliveri, Warren, NJ (US)

(73) Assignee: ManageIQ, Inc., Mahwah, NJ (US)

( * ) Notice: Subject to any disclaimer, the term of this patent is extended or adjusted under 35 U.S.C. 154(b) by 1501 days.

(21) Appl. No.: 11/945,549

(22) Filed: Nov. 27, 2007

(65) Prior Publication Data

US 2009/0138877 A1    May 28, 2009

(51) Int. Cl.
G06F 9/455    (2006.01)
G06F 7/04    (2006.01)

(52) U.S. Cl. .................................. 718/1; 726/2

(58) Field of Classification Search ........... 718/1; 726/2
See application file for complete search history.

(56) References Cited

U.S. PATENT DOCUMENTS

| | | | |
|---|---|---|---|
| 5,581,764 A | 12/1996 | Fitzgerald | |
| 5,761,477 A | 6/1998 | Wahbe | |
| 6,000,000 A | 12/1999 | Hawkins | |
| 6,085,244 A | 7/2000 | Wookey | |
| 6,169,976 B1 | 1/2001 | Colosso | |
| 6,253,258 B1 | 6/2001 | Cohen | |
| 6,292,889 B1 | 9/2001 | Fitzgerald | |
| 6,381,677 B1 | 4/2002 | Beardsley | |
| 6,463,535 B1 * | 10/2002 | Drews | 713/176 |
| 6,711,660 B1 | 3/2004 | Milne | |
| 6,772,330 B2 | 8/2004 | Merkin | |
| 6,850,252 B1 | 2/2005 | Hoffberg | |
| 7,024,549 B1 | 4/2006 | Luu | |
| 7,089,300 B1 * | 8/2006 | Birse et al. | 709/221 |
| 7,100,195 B1 | 8/2006 | Underwood | |
| 7,496,757 B2 | 2/2009 | Abbott | |
| 7,506,265 B1 | 3/2009 | Traut | |
| 7,577,722 B1 | 8/2009 | Khandekar | |
| 7,577,828 B2 | 8/2009 | Sammer | |
| 7,594,185 B2 | 9/2009 | Anderson | |
| 7,698,545 B1 | 4/2010 | Campbell | |
| 7,802,084 B2 | 9/2010 | Fitzgerald | |

(Continued)

FOREIGN PATENT DOCUMENTS

| WO | 2547630 | 6/2005 |
|---|---|---|
| WO | 2006036277 | 4/2006 |

OTHER PUBLICATIONS

Written Opinion of the International Searching Authority for International Application No. PCT/US08/84860 dated Jan. 23, 2009.

(Continued)

Primary Examiner — Meng-Ai An
Assistant Examiner — Brian Chew
(74) Attorney, Agent, or Firm — K&L Gates LLP (57) ABSTRACT

Methods and apparatus of locating an unauthorized virtual machine are disclosed. A virtual machine is registered with a management system. When the virtual machine is requested to start, the system determines whether the virtual machine is in an authorized environment. In an authorized environment, the virtual machine is enabled to operate normally. In an unauthorized environment, the virtual machine is disabled. The disabled virtual machine gathers information about the unauthorized environment and transmits the information to the virtual machine owner.

14 Claims, 10 Drawing Sheets

U.S. PATENT DOCUMENTS

| | | | |
|---|---|---|---|
| 8,015,563 B2* | 9/2011 | Araujo et al. | 718/1 |
| 2002/0073236 A1 | 6/2002 | Helgeson | |
| 2003/0009752 A1 | 1/2003 | Gupta | |
| 2003/0037181 A1 | 2/2003 | Freed | |
| 2003/0070087 A1 | 4/2003 | Gryaznov | |
| 2004/0073899 A1 | 4/2004 | Luk | |
| 2004/0128670 A1 | 7/2004 | Robinson | |
| 2004/0172550 A1 | 9/2004 | Sai | |
| 2004/0193913 A1* | 9/2004 | Han et al. | 713/200 |
| 2004/0204266 A1 | 10/2004 | Owens | |
| 2004/0205101 A1 | 10/2004 | Radhakrishnan | |
| 2004/0210653 A1 | 10/2004 | Kanoor | |
| 2004/0268347 A1 | 12/2004 | Knauerhase | |
| 2005/0033970 A1 | 2/2005 | Anson et al. | |
| 2005/0125513 A1 | 6/2005 | Sin-Ling Lam | |
| 2005/0246436 A1 | 11/2005 | Day | |
| 2005/0262101 A1 | 11/2005 | Halpern | |
| 2005/0283640 A1 | 12/2005 | Cheston | |
| 2005/0289542 A1 | 12/2005 | Uhlig | |
| 2006/0004667 A1 | 1/2006 | Neil | |
| 2006/0010440 A1 | 1/2006 | Anderson | |
| 2006/0025985 A1 | 2/2006 | Vinberg | |
| 2006/0026219 A1 | 2/2006 | Orenstein | |
| 2006/0036570 A1 | 2/2006 | Schaefer | |
| 2006/0059253 A1 | 3/2006 | Goodman | |
| 2006/0075252 A1 | 4/2006 | Kallahalla et al. | |
| 2006/0075487 A1* | 4/2006 | Pfleging et al. | 726/21 |
| 2006/0136720 A1 | 6/2006 | Armstrong | |
| 2006/0136910 A1 | 6/2006 | Brickell | |
| 2006/0136911 A1 | 6/2006 | Robinson | |
| 2006/0155735 A1 | 7/2006 | Traut | |
| 2006/0179476 A1 | 8/2006 | Challener | |
| 2006/0184937 A1 | 8/2006 | Abels et al. | |
| 2006/0218536 A1 | 9/2006 | Kirilline | |
| 2006/0218544 A1 | 9/2006 | Chakraborty | |
| 2006/0225065 A1 | 10/2006 | Chandhok | |
| 2006/0274060 A1 | 12/2006 | Ni et al. | |
| 2006/0294421 A1 | 12/2006 | Schneider | |
| 2007/0043860 A1 | 2/2007 | Pabari | |
| 2007/0050409 A1 | 3/2007 | Bugir | |
| 2007/0130232 A1 | 6/2007 | Therrien | |
| 2007/0136807 A1* | 6/2007 | DeLiberato et al. | 726/22 |
| 2007/0179987 A1 | 8/2007 | Lim | |
| 2007/0180493 A1 | 8/2007 | Croft et al. | |
| 2007/0192329 A1 | 8/2007 | Croft | |
| 2007/0198612 A1 | 8/2007 | Prahlad | |
| 2007/0198656 A1 | 8/2007 | Mazzaferri | |
| 2007/0204266 A1 | 8/2007 | Beaty | |
| 2007/0208685 A1 | 9/2007 | Blumenau | |
| 2007/0214408 A1 | 9/2007 | Straub | |
| 2008/0016187 A1 | 1/2008 | Neil | |
| 2008/0126439 A1 | 5/2008 | Kaminsky | |
| 2008/0301770 A1* | 12/2008 | Kinder | 726/2 |

OTHER PUBLICATIONS

Written Opinion of the International Searching Authority for International Application No. PCT/US08/84849 dated Jan. 12, 2009.
Written Opinion of the International Search Authority for International Application No. PCT/US07/81636 dated Jun. 3, 2008.
Written Opinion of the International Search Authority for International Application No. PCT/US07/81652 dated Apr. 23, 2008.
Written Opinion of the International Search Authority for International Application No. PCT/US07/81646 dated May 5, 2008.
Written Opinion of the International Search Authority for International Application No. PCT/US07/81647 dated Jun. 3, 2008.
"Cache-Based System Management Architecture with Virtual Applicances, Network Repository and Virtual Appliance Transceivers," Jun. 9, 2005, 23 pages.
"Configuration Management," Hewlett-Packard Development Company, L.P., 2006 [online] [Retrieved on Dec. 15, 2006] Retrieved from the Internet <URL:http://openview.hp.com/solutions/ascm/index.html>.
"Configuration Management Solutions for Desktops," Hewlett-Packard Development Company, L.P., 2006, [online] [Retrieved on Dec. 15, 2006] Retrieved from the Internet <URL:http://openview.hp.com/products/radia_mdsk/index.html>.
"Configuration Management Solutions for Servers," Hewlett-Packard Development Company, L.P., 2006, [online] [Retrieved on Dec. 15, 2006] Retrieved from the Internet <URL:http://openview.hp.com/products/radia_msvr/index.html>.
"EFI Framework FAQs," American Megatrends, Inc., 2004, 4 pages.
"JP1 Version 7i Desktop Management," Hitachi Asia Ltd., 2005 4 pages.
"Managing Configurations and Compliance with Oracle Enterprise Manager 10g," An OracleWhite Paper, Oracle, Sep. 2005, 9 pages.
"Microsoft Windows XP: Using Software Restriction Policies to Protect Against Unauthorized Software," Mircrosoft TechNet, Jan. 1, 2002, 28 pages.
"MSN Reduces New Server Build and Deploy Time by 98 Percent," Microsoft Corporation, Sep. 2003, 6 pages.
"Unicenter CA—Teleview Session Management, Enterprise Systems Management," ca, 2006, [online] [Retrieved on Dec. 15, 2006] Retrieved from the Internet <URL:http://www3.ca.com/solutions/Product.aspx?ID=1525>.
VMTN—Virtual Appliances: How to Build a Virtual Appliance,: VMware, Inc., 2006, 9 pages.
"VMware ACE, Product Datasheet," VMware, Inc., 2005, 2 pages.
Apvrille, A. et al., "DigSig: Run-Time Authentication of Binaries at Kernel Level," 2004 LISA XVIII, Nov. 14-19, 2004, pp. 59-66.
Bakos, G., "Honeypots and the Enterprise: Intelligence-based Risk Management," Insitute for Security Technology Studies, Dartmouth College, 98 pages, 2004.
Banerjee, S.et al., "Scalable Grid Service Discovery Based on UDDI," MGC '05, Nov. 28-Dec. 2, 2005, ACM, 6 pages.
Bloehdorn, S. et al., "TagFS—Tag Semantics for Hierarchical File Systems,"In Proceedings of the 6th International Conference on Knowledge Management (I-KNOW 06), Graz, Austria, Sep. 2-6, 2006, 8 pages, [online] Retrieved from the Internet <URL:http://semfs.ontoware.org/pubs/2006-2009-iknow2006-tagfs.pdf>.
Calder, B. et al., "The Entropia Virtual Machine for Destop Grids," VEE'05, ACM, Jun. 11-12, 2005, pp. 1-11.
Casper, B., "Using Network Appliance Snapshot Technology with VMware® ESX Server," Network Appliance, Inc., 2005, 14 pages.
Chen, Y., "Service-Oriented Computing: Architecture, Programming, and Applications," The Ninth IASTED International Conference on Software Engineering and Applications, Nov. 14-16, 2005, 40 pages.
Doser, J., "Generating Access Control Infrastructures from SecureUML Models," Albert-Ludwigs-Unversitat Freiburg, 24 pages, 2003.
Doser, J., "Using SecureUML to Secure Controllers," Albert-Ludwigs-Unversitat Freiburg. 28 pages, 2003.
Garfinkel, T. et al., "Terra: A Virtual Machine-Based Platform for Trusted Computing," SOSP '03, ACM, Oct. 19-22, 2003, pp. 193-206.
Garfinkel, T. et al., "When Virtual is Harder Than Real: Security Challenges in Virtual Machine Based Computing Environments," 6 pages, 2005.
Goldfein, J., "PAC095 Workstation 5 and Beyond: What's New," VMworld2005, Virtualize Now, 2005, 30 pages.
Haldar, V. et al., "Semantic Remote Attestation—A Virtual Machine Directed Approach to Trusted Computing," Proceedings of the Third Virtual Machine Research and Technology Symposium, USENIX Association, San Jose, CA, May 6-7, 2004, 14 pages.
International Search Report and Written Opinion of the International Searching Authority for International Application No. PCT/US08/84823 dated Jan. 22, 2009.
International Search Report and Written Opinion of the International Searching Authority for International Application No. PCT/US08/84829, dated Jan. 22, 2009.
International Search Report and Written Opinion of the International Searching Authority for International Application No. PCT/US08/84834, dated Jan. 13, 2009.
International Search Report and Written Opinion of the International Searching Authority for International Application No. PCT/US08/84844 dated Jan. 16, 2009.
Keahey, K. et al., "Virtual Infrastructure in the Grid," Jan. 30, 2006, 19 pages.

Keahey, K. et al., "Virtual Workspaces Achieving Quality of Service and Quality of Life in the Grid," 12 pages, 2005.

Kieffer, M., "Windows Virtualization Architecture," Microsoft Corporation, 2005, 23 pages.

Kim.H. et al., "Autograph: Toward Automated, Distributed Worm Signature Detection," 16 pages, 2004.

King, S.T. et al., "SubVirt: Implementing Malware with Virtual Machines," 14 pages, 2006.

Krsul, I. et al., "VMPLants: Providing and Managing Virtual Machine Executiong Environments for Grid Computing," IEEE, 2004, pp. 1-2.

Laverick, M., "VMware ESX 2.1/5 Server Administration II, Documents Version 1.3" RTFM Education, 117 pages, 2006.

Lemos, R., "Your Own Personal Matrix," PC Magazine, Oct. 17, 2006, 1 page.

Lin, B. et al., Towards an Understanding of Decision Complexity in IT Configuration,: IBM Corporation, 2006, 16 pages.

Lu, W. et al., "Making Your Workspace Secure: Establishing Trust with VMs in the Grid," 10 pages, 2007.

MacFarland, A. "PlateSpin Builds Flexibility into a clone-Based Data Center Lifestyle," The Clipper Group Navigator, Feb. 8, 2006, pp. 1-4.

Martinez, P. et al., "Using the Script MIB for Policy-Based Configuration Management," 16 pages, 2002.

Mohan, P. et al., "Semantic File Retrieval in File Systems Using Virtual Directories," 4 pages, 2006, [online] Retrieved from the Internet <URL:http://www.hipc.org/hipc2006/posters/semfs.pdf.

Naik, V.K. et al., "Configuring, Deploying, and Managing Virtual Grid Environments," pp. 1-5, 2005.

Newsome, J. et al., "Polygraph: Automatically Generating Signatures for Polymorphic Worms," 16 pages, 2005.

Newsome, J. et al., "Polygraph: Automatically Generating Signatures for Polymorphic Worms," May 2005, 46 pages.

Potnis, N., "Debugging OS's with Time Traveling Virtual Machines," University of Michigan, 26 pages, 2006.

Reinhardt, M., "Energy-Aware Scheduling of Virtual Machines in a Multiprocessor Environment," Universitat Karlsruhe, Jun. 13, 2006, 86 pages.

Schenk, S. et al., "TagFS: Bringing Semantic Metadata to the Filesystem," Institute for Computer Science, University of Koblenz, 2 pages, [online] Retrieved from the Internet <URL:http://eswc2006.org/poster-papers/FP31-Schenk.pdf>.

Schenk, S. et al. "TagFS—TagSemantics for Hierarchical File Systems," 2006, Univeristy of Koblenz Landau Germany, 31 pages, [online] Retrieved from the Internet <URL:http://i-know.know-center.tugraz.at/content/download/734/2960/file/völkel.pdf>.

Sirer, E.G. et al., "Design and Implementation of a Distributed Virtual Machine for Networked Computers," SOSP-17, ACM, Dec. 1999, pp. 202-216.

St. Arnaud, B., "Service Oriented Architectures for R&E Networks Google Mashing Everything," CANARIE, Inc., 18 pages, 2006.

Stewart, V., "Network Appliance & VMware ESX Server: Instantaneous Backup & Recovery with NetApp Snapshot Technology," Oct. 2005, 15 pages.

Sufatrio et al., "A Machine-Oriented Integrated Vulnerability Database for Automated Vulnerability Detection and Processing," 2004 LISA XVII, Nov. 14-19, 1004, pp. 47-58.

Traugott, S. et al. "Why Order Matters: Turing Equivalence in Automated Systems Adminstration," USENIX Large Installation System Administration Conference, Nov. 3-8, 2002, pp. 1-35.

TRIUMF/HEPnet Lightpath Object Composition GUI, Canarie, 14 pages, 2005.

Verdon, D. et al. "Risk Analysis in Software Design," IEEE Security & Privacy, 2004, pp. 32-37.

VMworld2005 Virtualize Now, VMware Education Services Course, Las Vegas, Oct. 18-20, 2005, 10 pages.

Waldspurger, C., PAC485 Managing Datacenter Resources Using the VirtualCenter Distributed Resource Scheduler, VMWorld2005, VMware, Inc., 2005, 36 pages.

Wang, Y-M, et al., "Detecting Stealth Software with Strider GhostBuster,"Dec. 13, 2004, Technical Report MSR-TR-2005-25, Microsoft Corporation, 11 pages.

Wang, Y-M, et al. Gatekeeper: Monitoring Auto-Start Extensibility Points (ASEPs) for Spyware Management, 2004 LISA XVIII, Nov. 14-19, 2004, pp. 33-46.

Whitaker, A. et al., "Using Time Travel to Diagnose Computer Problems," 6 pages, 2004.

Williams, M.A., "Anti-Trojan and Trojan Detection with In-Kernel Digital Signature Testing of Executables," NetXSecure NZ Limited, pp. 1-12, Apr. 16, 2002.

Zhao, X. et al., "SVGrid: A SecureVirtual Environment for Untrusted Grid Applications," pp. 1-8, 2005.

International Search Report and Written Opinion of the International Searching Authority for International Application No. PCT/US08/84853, dated Jan. 28, 2009.

Keahey, K., "Working Spaces: Virtual Machines in the Grid," Globus World 2005, Feb. 10, 2005, 23 pages.

Written Opinion of the International Search Authority for International Application No. PCT/US07/81644 dated Jun. 17, 2008.

* cited by examiner

LOCATING AN UNAUTHORIZED VIRTUAL MACHINE AND BYPASSING LOCATOR CODE BY ADJUSTING A BOOT POINTER OF A MANAGED VIRTUAL MACHINE IN AUTHORIZED ENVIRONMENT

TECHNICAL FIELD

The present application relates in general to virtual machines and more specifically to methods and apparatus of locating an unauthorized use of a virtual machine.

BACKGROUND

Virtual machines are becoming increasingly prevalent, and virtual machines and virtual machine environments frequently change. It is preferable for virtual machines to be compatible with various environments, and as a result, there are utilities to convert virtual machines from one environment to another. A challenge for virtual machine developers and virtual machine owners is that the virtual machines are easily copied and transferred to an unauthorized environment, and the developer or owner may never know the unauthorized copy was made. Because a virtual machine is not a physical item, theft detection and locating an unauthorized copy of a virtual machine is often difficult.

Current measures taken to stop unauthorized copies of virtual machines include many conventional methods to stop unauthorized copying of software. For example, virtual machines may be protected by copyright laws and license agreements. These laws and agreements may impose requirements on a virtual machine user such as restricting access authorized personnel. In addition, license agreements may impose procedures for keeping copies of virtual machines secured. However, these measures are inefficient and often ineffective in light of the intangible properties of a virtual machine, and the considerable difficulty in detecting whether an unauthorized copy of a virtual machine has been made.

DETAILED DESCRIPTION OF EXAMPLE EMBODIMENTS

Figure 1:
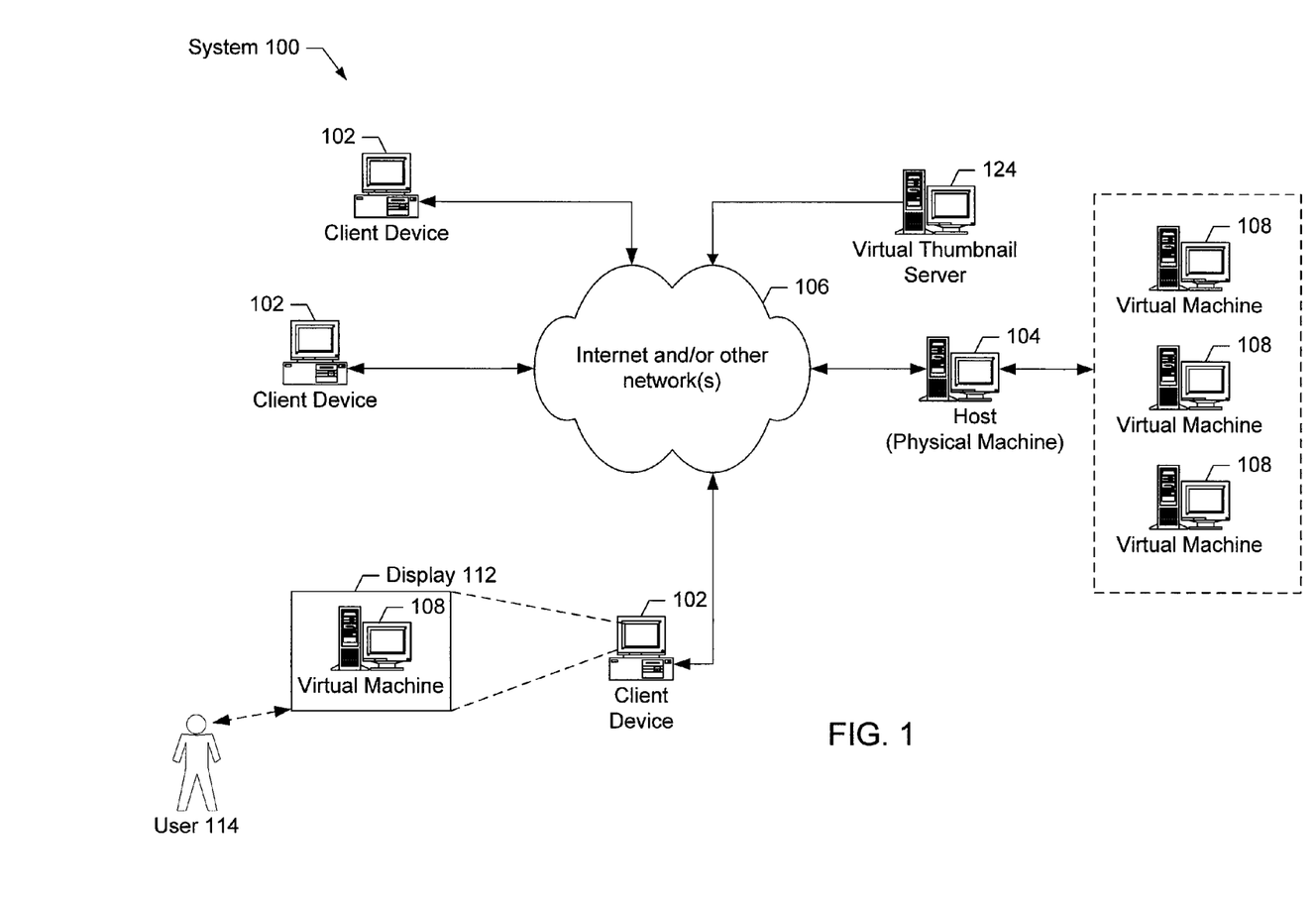
FIG. 1 is a high level block diagram of an example network communicating system.

The present system is most readily realized in a network communications system. A high level block diagram of an example network communications system 100 is illustrated in FIG. 1. The illustrated system 100 includes one or more client devices 102, one or more host physical machines 104, each host physical machine 104 hosting one or more virtual machines 108. The clients 102, and host physical machine 104 hosting virtual machines 108 may communicate with each other via a connection to one or more communications channels 106 such as the Internet or some other data network, including, but not limited to, any suitable wide area network or local area network. It will be appreciated that any of the devices described herein may be directly connected to each other instead of over a network.

One host physical machine 104 may interact with a large number of users 114 at a plurality of different client devices 102. Accordingly, each host physical machine 104 is typically a high end computer with a large storage capacity, one or more fast microprocessors, and one or more high speed network connections. Conversely, relative to a typical host physical machine 104, each client device 102 typically includes less storage capacity, a single microprocessor, and a single network connection.

Each host physical machine 104 stores a plurality of files, programs, and/or web pages in one or more memories for use by the client devices 102. A single host physical machine 104 typically hosts a plurality of virtual machines 108. A virtual machine 108 appears to be a complete physical machine to end users. Each virtual machine 108 may be configured differently with its own operating system, applications, memory, virtual hardware, etc. A host physical machine 104 can have various container types for hosting the virtual machines 108 (e.g., VMware, Xen, Microsoft, etc.). The host physical machine 104 may have various options for managing the execution of the plurality of virtual machines 108.

Figure 2:
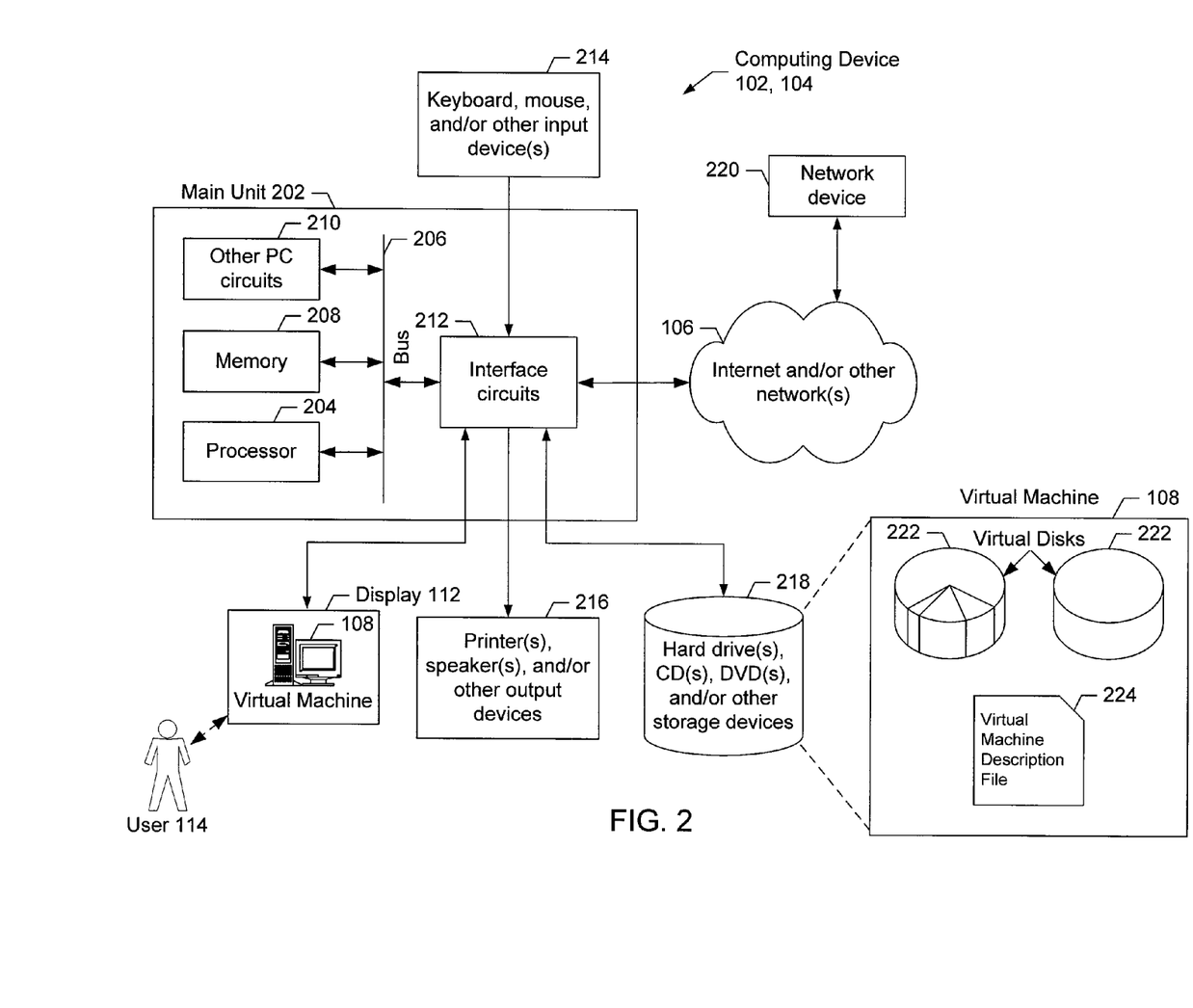
FIG. 2 is a detailed block diagram showing an example of a computing device.

A detailed block diagram of the electrical systems of an example computing device (e.g., a client device 102, and physical machine 104 hosting a virtual machine 108) is illustrated in FIG. 2. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays 112, printers, speakers, and/or other output devices 216 may also be connected to the main unit 202 via the interface circuit 212. The display 112 may be a cathode ray tube (CRTs), liquid crystal displays (LCDs), or any other type of display. The display 112 generates visual displays of data generated during operation of the computing device 102, 104. For example, the display 112 may be used to display web pages received from a computing device 102, 104. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as a plurality of virtual machines 108, which may be used by the computing device 102, 104. As described in more detail below, a virtual machine 108 preferably includes one or more virtual disks 222 and a virtual machine description file 224.

The computing device 102, 104 may also exchange data with other network devices 220 via a connection to the network 106. The network connection may be any type of network connection, such as an Ethernet connection, digital subscriber line (DSL), telephone line, coaxial cable, etc. Access to a computing device 102, 104 can be controlled by appropriate security software or security measures. An individual users' access can be defined by the computing device 102, 104 and limited to certain data and/or actions. Accordingly, users of the system 100 may be required to register with one or more computing devices 102, 104.

As noted previously, a host physical machine 104 may have various options for managing the execution of the plurality of virtual machines 108. A management system is a system of managing one or more host physical machines 104 and/or virtual machines 108 which may accomplish various tasks, such as facilitating the prevention of the virtual machines 108 being copied and used in an unauthorized manner. A management system may be implemented in both a host physical machine 104 and associated virtual machines 108.

Figure 3:
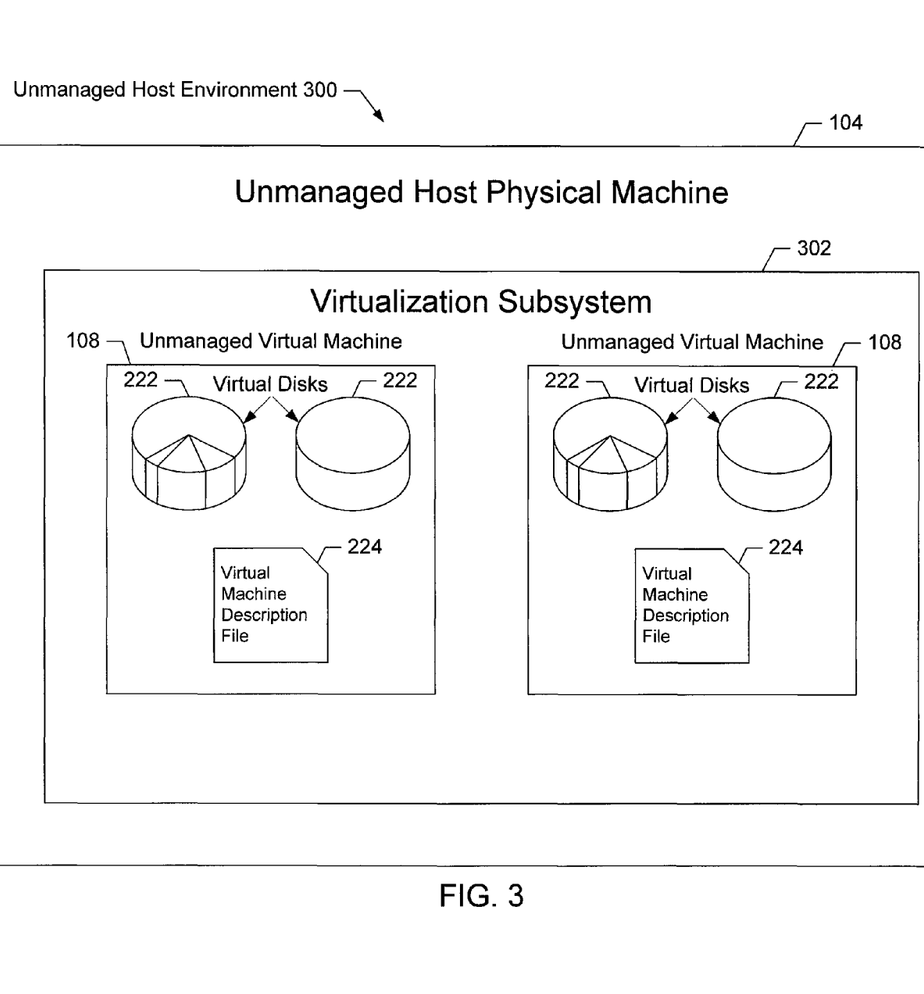
FIG. 3 is a block diagram of an example unmanaged host environment.

FIG. 3 is a block diagram of an example of an unmanaged host environment 300. An unmanaged host environment 300 is an ordinary host physical machine 104 that is not managed by a management system to facilitate prevention of unauthorized virtual machine use. The host physical machine 104 has a virtualization subsystem 302 (e.g., VMware) which hosts the virtual machines 108. The virtual machines 108 hosted in the virtualization subsystem 302 are unmanaged virtual machines 108. Unmanaged virtual machines 108 are ordinary virtual machines 108 that are not managed by a management system to prevent unauthorized virtual machine use. The virtual machines 108 contain one or more virtual disks 222 and a virtual machine description file 224. The virtualization subsystem 302 may host many virtual machines 108 concurrently, and the virtual machines 108 may be configured with a variety of different operating systems and features.

Figure 4:
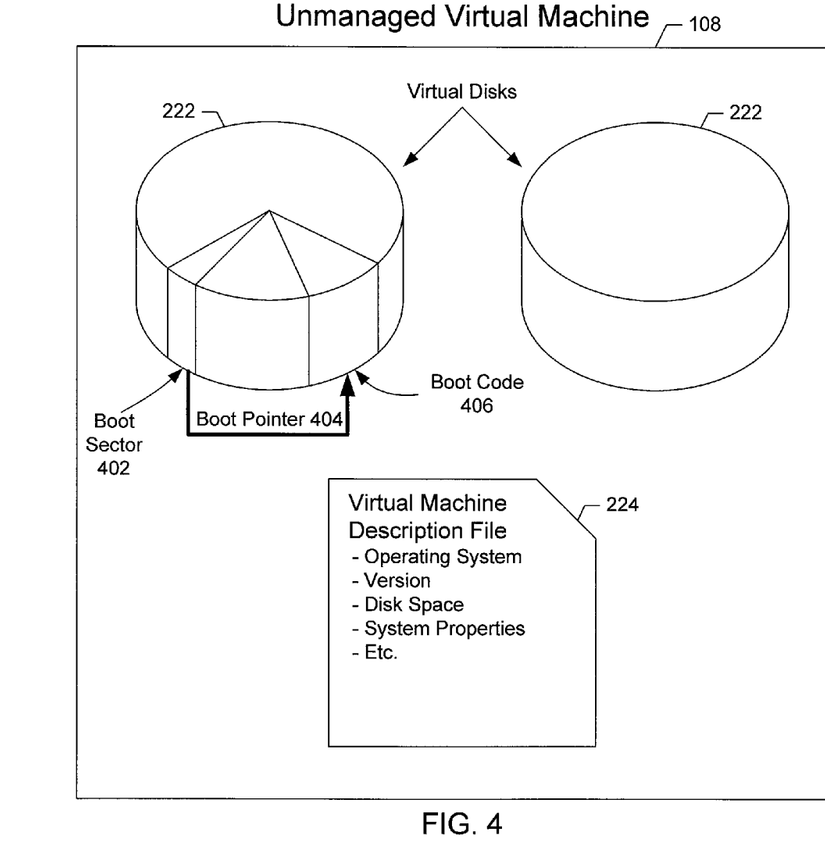
FIG. 4 is a block diagram of an example unmanaged virtual machine.

FIG. 4 is a block diagram of an example unmanaged virtual machine 108. The virtual machine description file 224 includes information about the associated virtual machine 108 such as the operating system used by the virtual machine 108, the version of the virtual machine 108, disk space allocated to the virtual machine 108, system properties associated with the virtual machine 108, etc. The virtual disks 222 contain the code and data associated with the virtual machine 108, including boot code, guest operating code, applications, etc., as well as the disk space needed for the virtual machine 108 to operate. The virtual disks 222 also include a boot sector 402 with a boot pointer 404. Upon startup, the boot pointer 404 points to an address specified in the boot sector 402, which boots a boot code 406 (e.g., a guest operating system) of the virtual machine 108. Once the boot code 406 of the virtual machine 108 is running properly, the virtual machine 108 appears to be a physical machine to the user 114. However, a virtual machine 108 is not a physical machine, rather, a virtual machine 108 is essentially data formatted for use by a virtualization subsystem 302 that can be copied and/or modified.

Figure 5:
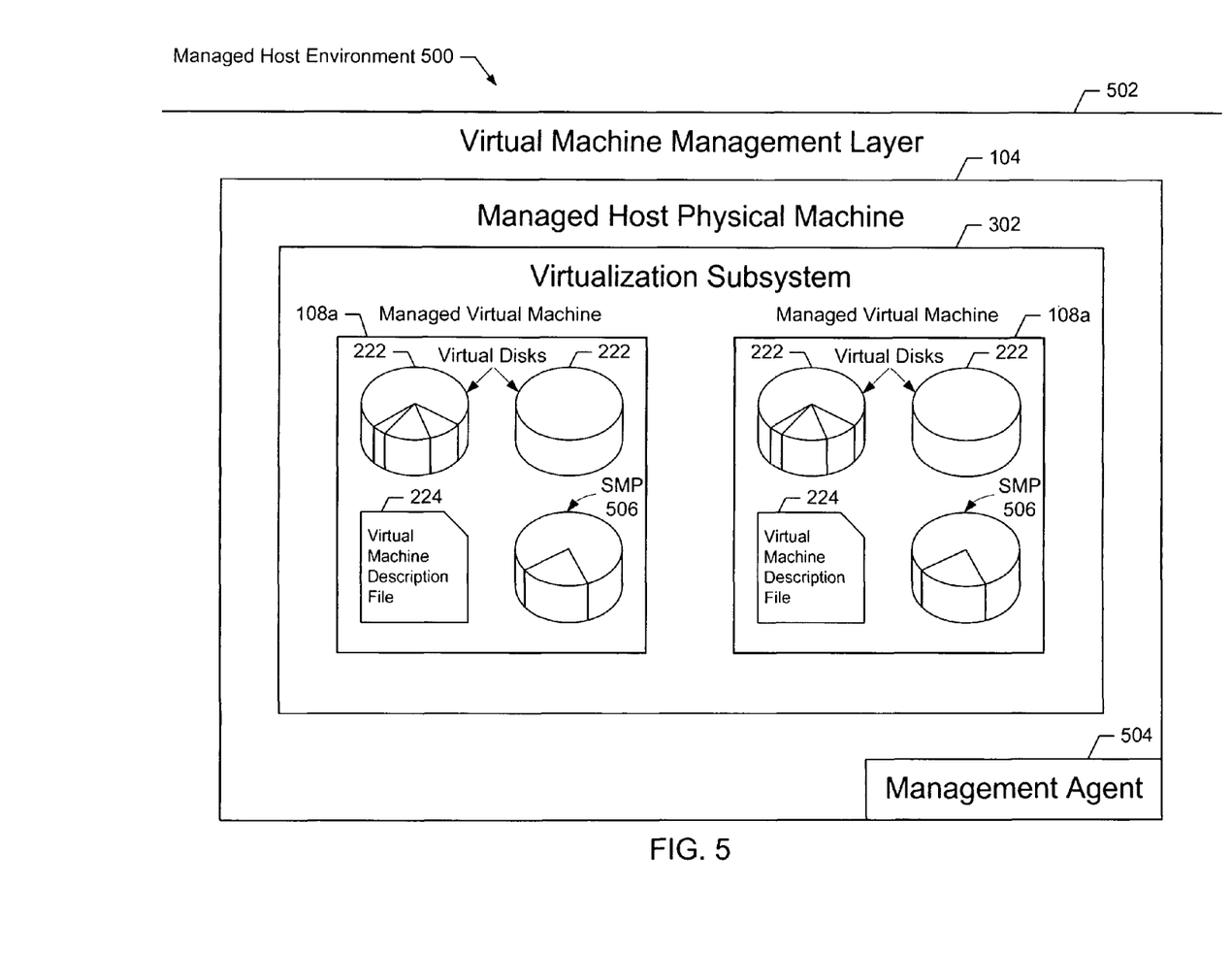
FIG. 5 is a block diagram of an example managed host environment.

FIG. 5 is a block diagram of an example of a managed host environment 500. A managed host environment 500 includes a Virtual Machine Management Layer 502 that may or may not be installed on the same host physical machine 104 as the previously-unmanaged virtual machine 108. When an unmanaged host environment 300 and an associated unmanaged virtual machine 108 are registered with the management system, a Virtual Machine Management Layer 502 may be installed on a host physical machine 104, which may support virtualization subsystems 302. Also, a Management Agent 504 may be installed on the host physical machine 104. It should be appreciated that a Management Agent 504 and/or a Virtual Machine Management Layer 502 are components of a management system that need not be installed on the host physical machine 104 that contains unmanaged virtual machine 108. The Management Agent 504 and/or the Virtual Machine Management Layer 502 may reside on any machine, physical or virtual, that has access to the files comprising the virtual machines 108 being managed. For instance, a Virtual Machine Management Layer 502 may be operatively associated with multiple Management Agents 504 and virtual machines 108 on multiple host physical machines 104. Further, a Management Agent 504 may be operatively associated with multiple virtual machines 108 on multiple host physical machines 104. Also, the Virtual Machine Management Layer 502 may be a part of the Management Agent 504, and the Management Agent 504 may reside in the virtualization subsystem 302.

The management system facilitates many features including the prevention of unauthorized virtual machine use. A managed virtual machine 108a is a virtual machine 108 managed by such a management system. Installing the management system converts an ordinary unmanaged host environment 300 into a managed host environment 500 and the associated unmanaged virtual machines 108 into managed virtual machines 108a. Preferably, the host physical machine 104 and each virtual machine 108 are registered with the management system, to be associated with each other as managed host environment 500 and an associated managed virtual machine 108a. An authorized environment exists if both the host physical machine 104 and the virtual machine 108 are registered with the management system to be associated with each other. Put another way, an authorized environment is an environment where a managed virtual machine 108a and a managed host physical machine 104 are associated with each other and the managed virtual machine 108a is hosted by a managed host physical machine 104. An unauthorized environment exists when either the host physical machine 104 or the virtual machine 108 is not registered with the management system. Put another way, an unauthorized environment exists when a managed host physical machine 104 is attempting to host an unmanaged virtual machine 108 or when a managed virtual machine 108a is attempting to be hosted by an unmanaged host physical machine 104. An unauthorized environment also exists when a managed virtual machine 108a is attempting to be hosted by a managed host physical machine 104, but the managed virtual machine 108a and the managed host physical machine 104 are not associated with each other (e.g., Customer A's virtual machine 108 is registered to be associated with Customer A's host physical machine 104, so Customer A's virtual machine 108 is in an unauthorized environment if used with Customer B's host physical machine 104 registered to be associated with Customer B's virtual machines). A managed virtual machine 108a may operate normally in an authorized environment, but will operate differently in an unauthorized environment.

The addition of the Virtual Machine Management Layer 502 and Management Agent 504 changes the unmanaged host environment 300 into a managed host environment 500. A Virtual Machine Management Layer 502 and Management Agent 504 typically only exist in a managed host environment 500. The Virtual Machine Management Layer 502 determines whether a virtual machine 108 is registered for use with the host physical machine 104. Preferably, the Virtual Machine Management Layer 502 is operatively associated with one or more particular virtual machines 108 on one or more host physical machines 104, and can detect whether a virtual machine 108 attempting to run is operatively associated with the Virtual Machine Management Layer 502. If the managed virtual machine 108a is operatively associated with the Virtual Machine Management Layer 502, the Virtual Machine Management Layer 502 and the Management Agent 504 enable the managed virtual machine 108a to operate normally. If a managed virtual machine 108a attempts to run in an unmanaged host environment 300, there will be no Virtual Machine Management Layer 502 and/or Management Agent 504. The host physical machine will still submit a start request to the managed virtual machine 108a, but the managed virtual machine 108a will not boot properly because the boot pointer has never been set to point to the virtual machine's boot code.

Even if a Virtual Machine Management Layer 502 is present, the management system determines whether the managed virtual machine 108a is attempting to run in an authorized environment. The Virtual Machine Management Layer 502 may intercept a start request and complete a policy check to determine if the virtual machine 108 is in an authorized environment. If the environment is not authorized, the Management Agent 504 does not enable the virtual machine 108 boot code 406 to run, so in an unauthorized environment the managed virtual machine 108a will not operate normally.

Figure 6:
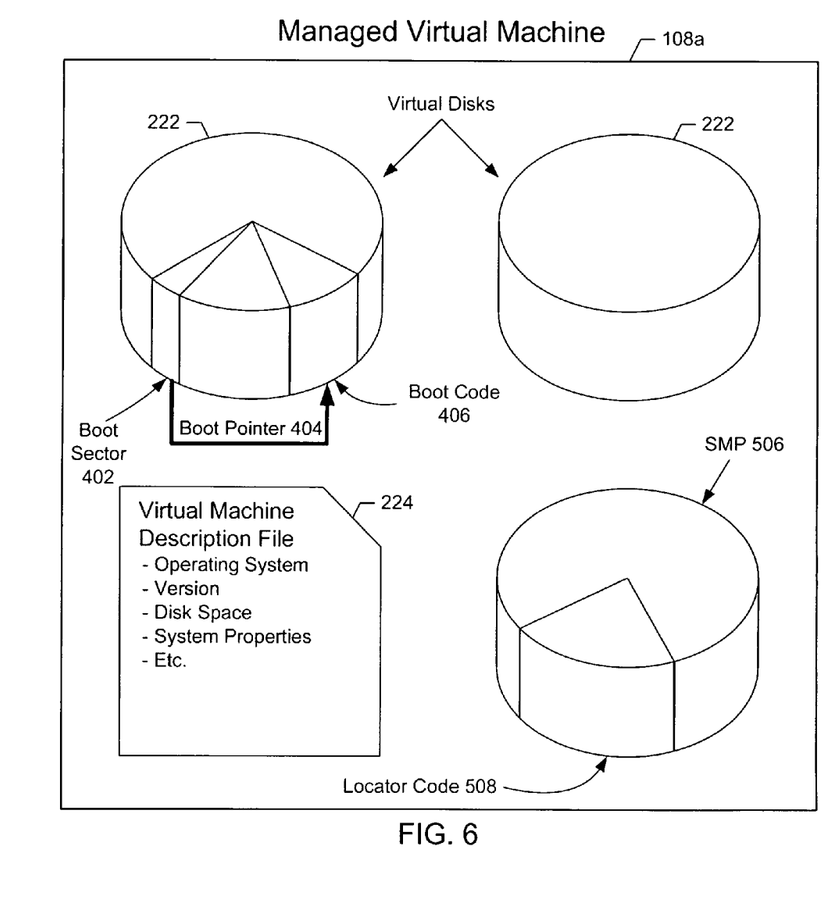
FIG. 6 is a block diagram of an example managed virtual machine.

FIG. 6 is a block diagram of an example managed virtual machine 108a. When the virtual machine 108 is registered with a management system, the address in the boot sector 402 is changed to point to a Systems Management Partition 506 ("SMP"), which is installed in a virtual disk 222 (e.g., an additional virtual disk). The SMP 506 can be read and written by the management system to help manage the virtual machine 108 and the virtual machine's 108 settings and operations. The SMP 506 provides management functions such as detecting and locating unauthorized use of the virtual machine 108. In the event of an unauthorized use of a managed virtual machine 108a, a portion of the SMP 506 identifies location information associated with the unauthorized use and then notifies the virtual machine 108 owner about the unauthorized use including the location information. The portion of the SMP 506 that performs this function will be referred to herein as the "Locator Code" 508. Once installed, the SMP 506 and accompanying Locator Code 508 continue to be an integrated part of the managed virtual machine 108a. If the managed virtual machine 108a is copied, the SMP 506 with the Locator Code 508 is also copied.

The example virtual machine 108 illustrated in FIG. 6 has the SMP 506 installed to facilitate identification of unauthorized use. However, the SMP 506 may not determine that there is an unauthorized use. Rather, the Virtual Machine Management Layer 502 preferably determines if the use is authorized, and thus, whether the Locator Code 508 should be disabled. The Virtual Machine Management Layer 502 and SMP 506 may be operatively associated to facilitate detection of an unauthorized environment for a virtual machine 108 attempting to operate in a managed host environment 500.

The example managed virtual machine 108a illustrated in FIG. 6 is running on the example managed host environment 500 illustrated in FIG. 5, so the boot pointer 404 is pointing to the boot code 406 because the Management Agent 504 has set the boot sector address 402 to point to the boot code 406. By setting the boot sector address 402 to point to the boot code 406, the Management Agent 504 has enabled the managed virtual machine 108a to operate normally. In an unauthorized environment, without the Management Agent 504 setting the boot pointer 404 to point to the boot code 406, the virtual machine 108 preferably will not operate normally.

In an authorized environment, the Management Agent 504 will reset the boot pointer 404 to point back to the Locator Code 508 once the boot pointer 404 has pointed to the boot code 406, which is running normally (e.g., guest operating system code is running normally). Therefore, on the next startup, the boot pointer 404 will point to the Locator Code 508 unless the virtual machine 108 is running in an authorized environment.

Figure 7:
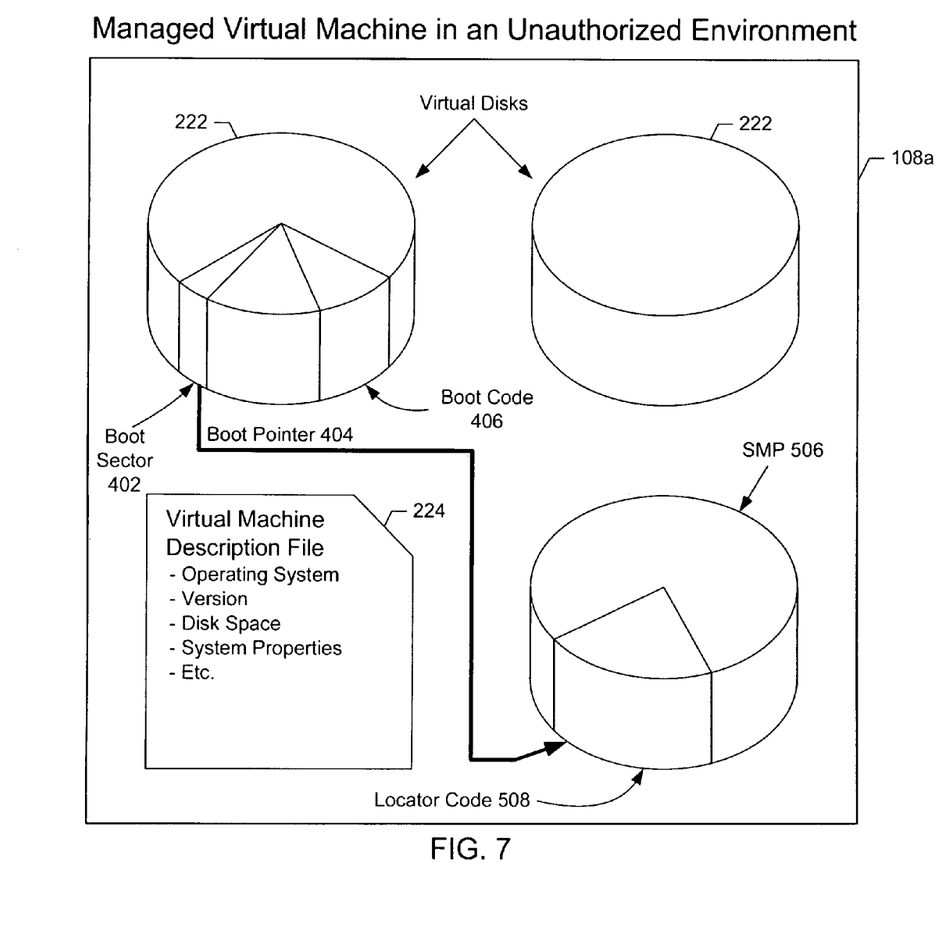
FIG. 7 is a block diagram of an example managed virtual machine in an unmanaged host environment.

FIG. 7 is a block diagram of an example managed virtual machine 108a, attempting to operate in an unmanaged host environment 300. When the virtual machine 108 is requested to start, the Management Agent 504 is not on the unauthorized host physical machine's 104 virtualization subsystem 302. Accordingly, the boot pointer 404 is pointing to the Locator Code 508 in the SMP 506 because the Management Agent 504 has not set the boot sector address 402 to point to the boot code 406. The Locator Code 508 preferably collects information such as IP address and other host information to help identify the location of the unauthorized host physical machine 104. Then, the Locator Code 508 notifies the owner of the use and the information associated with the location of the use. Various means of transmitting the unauthorized use and associated location information may be employed. After the location of the unauthorized use has been received by the owner, the Locator Code 508 may shut down the virtual machine 108, or the virtual machine 108 may be allowed to run (e.g., to collect and transmit additional data).

Figure 8:
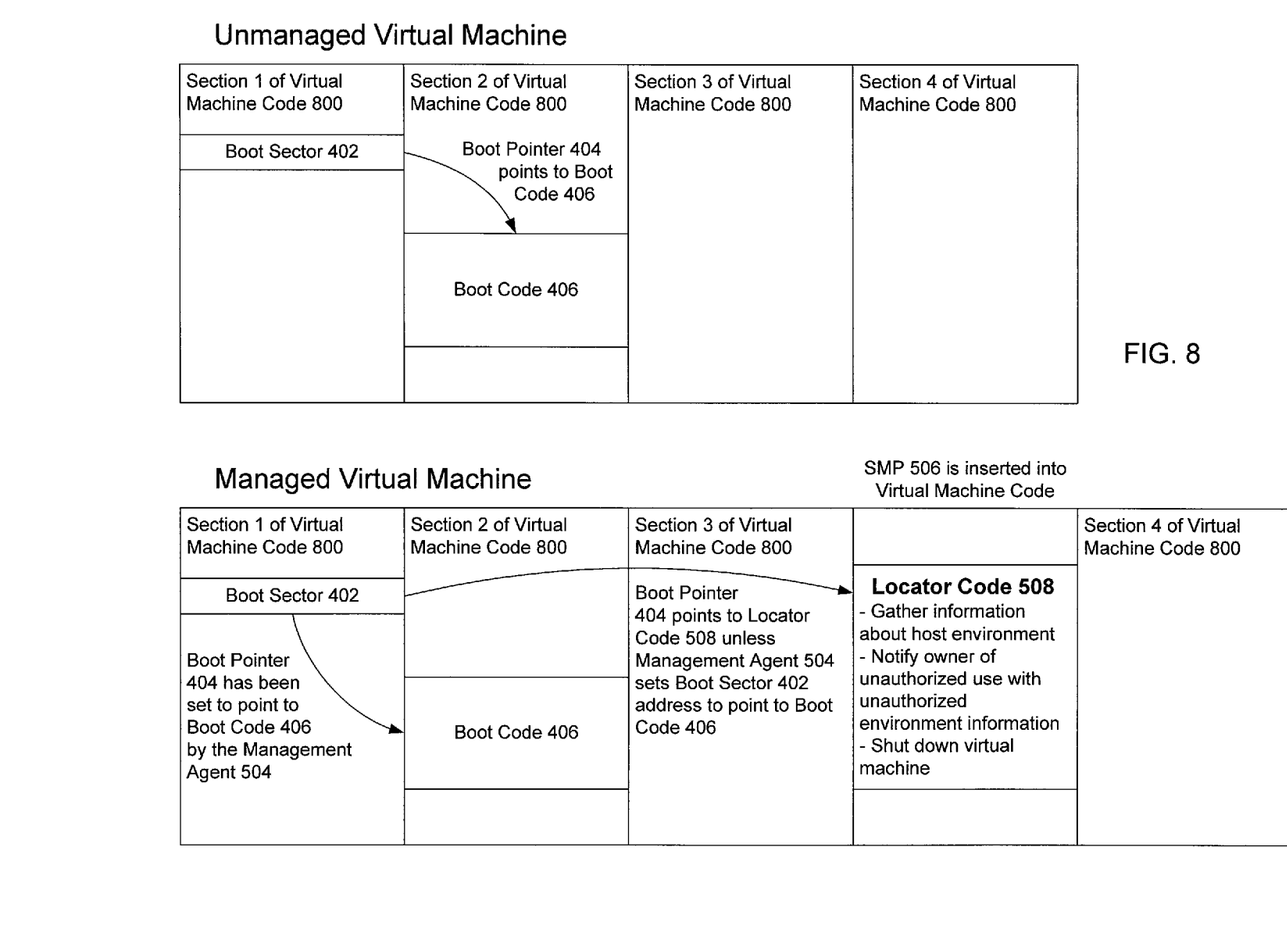
FIG. 8 is an alternative example virtual machine before and after the virtual machine is modified with a system management partition (SMP).
Figure 9:
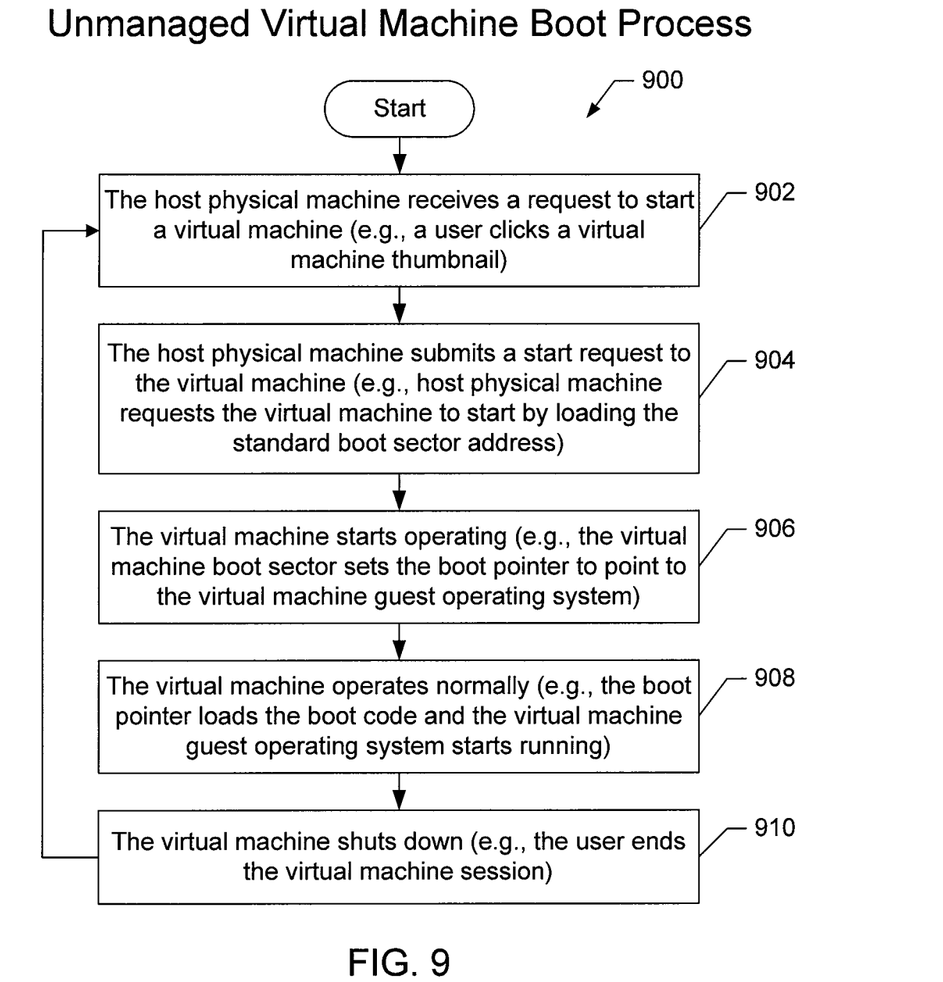
FIG. 9 is a flowchart of an example boot process for an unmanaged virtual machine in an unmanaged host environment.

FIG. 8 is an alternative example virtual machine 108 before and after the virtual machine 108 is modified by the management system to include an SMP 506. An unmanaged virtual machine's 108 boot pointer 404 points to the boot code 406 even if a copied version of the unmanaged virtual machine 108 is being used in an unauthorized environment. However, a managed virtual machine 108a that has been copied only points to the boot code 406 on the managed host environment 500 associated with the managed virtual machine 108a, because only a managed host environment 500 will have a Management Agent 504 to set the boot sector 402 address to point to the boot code 406. In an unauthorized environment, the Locator Code 508 collects information about the unauthorized environment such as IP address and other host information. The Locator Code 508 preferably sends the collected information to the owner, notifying the owner that an unauthorized copy of the virtual machine 108 has been used and the information associated with the location of the use FIG. 9 is a flowchart of an example boot process 900 for an unmanaged virtual machine 108 in an unmanaged host environment 300. Although the boot process 900 is described with reference to the flowchart illustrated in FIG. 9, it will be appreciated that many other methods of performing the acts associated with boot process 900 may be used. For example, the order of many of the blocks may be changed, and many of the blocks described are optional.

The boot process 900 begins when the host physical machine 104 receives a request to start a virtual machine 108 (block 902). For example, a user 114 clicks a virtual machine 108 thumbnail to start a virtual machine 108. Next, the host physical machine 104 submits a start request to the virtual machine 108 (block 904). For example, the host physical machine 104 requests the virtual machine 108 to start by loading the standard boot sector 402 address. FIG. 4 is a block diagram of an example unmanaged virtual machine 108, which illustrates the boot sector 402 located on virtual disk 222. The virtual machine 108 then starts operating (block 906). For example, the virtual machine 108 boot sector 402 is set for the boot pointer 404 to point to the boot code 406, which may contain the virtual machine 108 guest operating system. FIG. 4 illustrates an example of the boot sector 402 set to point the boot pointer 404 to the boot code 406. There is no management system interfering with the boot process 900 because the virtual machine 108 and the host physical machine 104 are both unmanaged.

Once the virtual machine 108 in this example is started, the virtual machine 108 operates normally (block 908). For example, once the boot code 406 loads, and the guest operating system is running, the virtual machine 108 may execute one or more applications. At some point, the virtual machine 108 may shut down (block 910). For example, the user 114 may end the virtual machine 108 session by closing down the virtual machine 108. The boot process 900 may be restarted after the virtual machine 108 shuts down. The boot process 900 is not affected by whether the virtual machine 108 is an original version of the virtual machine 108 or an unauthorized copy of the virtual machine 108.

Figure 10:
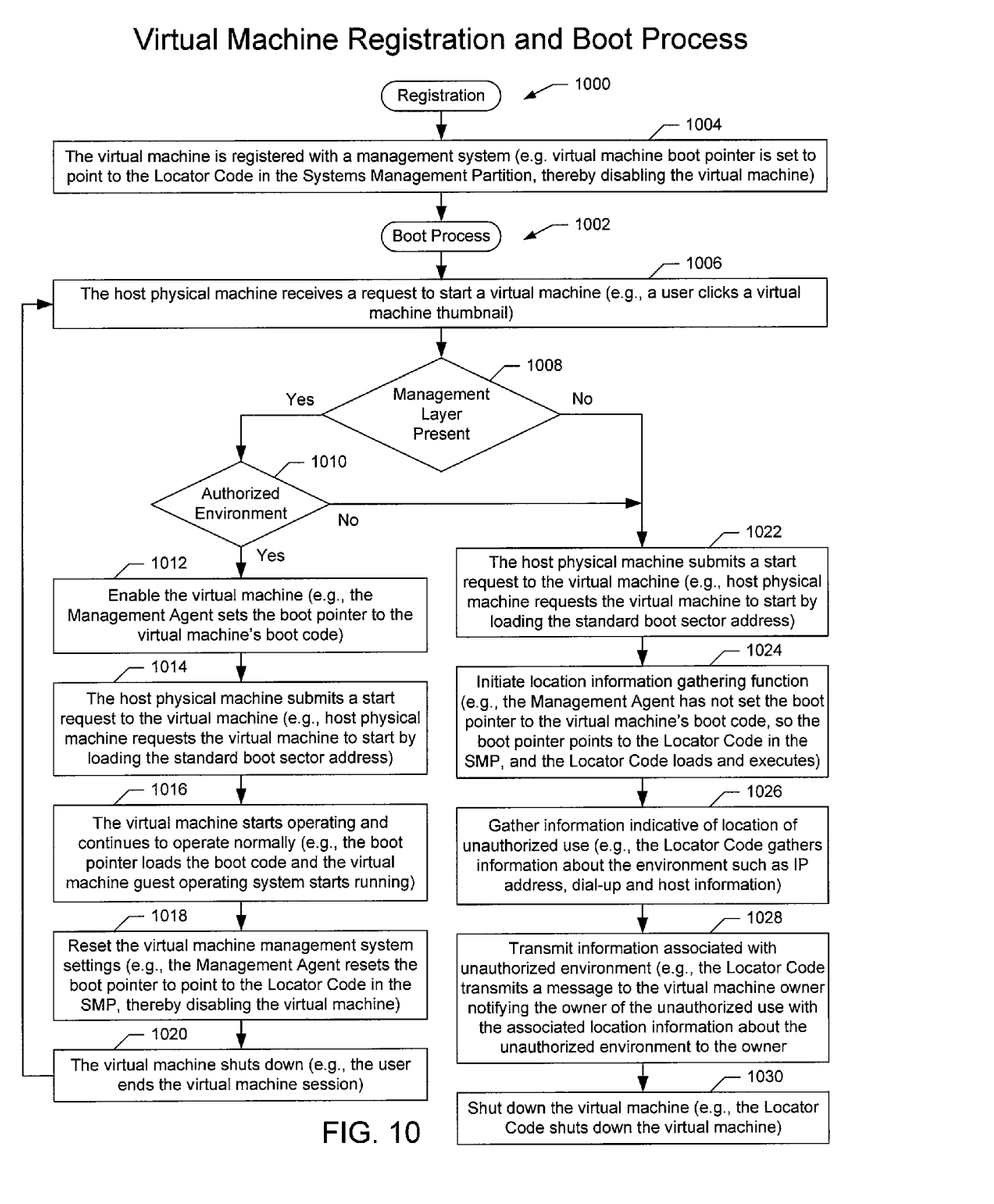
FIG. 10 is a flowchart of an example registration and boot process for a managed virtual machine.

FIG. 10 is a flowchart of an example registration process 1000 and boot process 1002 for a managed virtual machine 108a. Although the registration process 1000 and boot process 1002 are described with reference to the flowchart illustrated in FIG. 10, it will be appreciated that many other methods of performing the acts associated with registration process 1000 and boot process 1002 may be used. For example, the order of many of the blocks may be changed, and many of the blocks described are optional.

The registration process 1000 occurs when the virtual machine 108 is registered with a management system (block 1004). For example, the virtual machine 108 boot pointer 404 is set to point to the Locator Code 508 in the Systems Management Partition 506, thereby disabling the virtual machine 108. It should be understood that the management system may implement different and/or supplemental methods of management via the registration process 1000. The various methods comprising the registration process 1000 may increase the difficulty of enabling a managed virtual machine 108a through unauthorized means. In one example, rather than setting the virtual machine 108 boot pointer 404 to point to the Locator Code 508, the management system removes and/or encrypts portions of the virtual machine's 108 data such that said virtual machine's 108 data may only be restored by the Virtual Machine Management Layer 502. The Virtual Machine Management Layer 502 may maintain the removed data and/or an encryption key, so only the Virtual Machine Management Layer 502 may restore and/or decrypt the managed virtual machine's 108a data. Typically, when a multiplicity of methods are employed to disable a virtual machine 108, the multiplicity of methods are addressed in order to enable the virtual machine 108. FIG. 8 further illustrates an example virtual machine 108 before and after the virtual machine 108 is registered with a management system. Upon registration, the SMP 506 with Locator Code 508 is inserted into the virtual machine 108. By setting the virtual machine 108 boot pointer 404 to point to the Locator Code 508, the virtual machine is disabled.

Once the virtual machine 108 has been registered with a management system, the host physical machine 104 may begin the boot process 1002 at the request of a user. The host physical machine 104 may receive requests to start a virtual machine 108 (block 1006). For example, a user 114 clicks a virtual machine 108 thumbnail to start a virtual machine 108. Next, the management system determines whether a management layer is present on the host physical machine 104 (block 1008). It should be appreciated that the management system may not affirmatively determine that no management layer is present following a start request, rather, this determination may be implicitly made by what the management system and/or management layer do not determine. For example, if there is no Virtual Machine Management Layer 502 present, the boot pointer which is previously set to point to the Locator Code 508, may load and execute upon a start request. Put another way, the management system may be set up to determine that the management layer is not present by the absence of the happening of an event, for example, an event the Virtual Machine Management Layer 502 would perform if the Virtual Machine Management Layer 502 was present.

If a management layer is present, the management system then determines if the managed virtual machine 108a is in an authorized environment (block 1010). If the managed virtual machine 108a is in an authorized environment, the management system determines that the managed virtual machine 108a should run. For example, the Virtual Machine Management Layer 502 may determine that the managed virtual machine 108a is associated with the host physical machine 104 the managed virtual machine 108a is being requested to run on. FIG. 5 is a block diagram of an example managed host environment 500, which illustrates the Virtual Machine Management Layer 502. The Virtual Machine Management Layer 502 preferably does a policy check as a result of the host physical machine's 104 request to start to the managed virtual machine 108a. The Virtual Machine Management Layer 502 may determine that the managed virtual machine 108a is attempting to operate in an authorized environment or may determine that the managed virtual machine 108a is attempting to operate in an unauthorized environment. If the Virtual Machine Management Layer 502 determines that the managed virtual machine 108a is attempting to operate in an authorized environment, the Virtual Machine Management Layer 502 makes the determination that the managed virtual machine 108a should be allowed to run.

If the management layer determines that the managed virtual machine 108a is attempting to operate in an authorized environment, (block 1010) and that it therefore should run, the managed virtual machine 108a is enabled (block 1012). For example, the Management Agent 504 sets the boot pointer 404 to the virtual machine's 108 boot code 406. FIG. 5 is a block diagram of an example managed host environment 500, which illustrates the Management Agent 504. The Management Agent 504 may exist in the virtualization subsystem 302 and preferably may modify the virtual machine 108 boot sector 402 in order to set the boot pointer 404 to the virtual machine's 108 boot code 406. As shown in FIG. 6, a block diagram further illustrates an example of a managed virtual machine 108a that has had the boot sector 402 modified by the Management Agent 504 to allow the boot pointer 404 to point to the boot code 406.

Once the managed virtual machine 108a is enabled, the host physical machine 104 submits a start request to the managed virtual machine 108a (block 1014). For example, the host physical machine 104 requests the managed virtual machine 108a to start by loading the Standard boot sector 402 address. The managed virtual machine 108a then starts operating and continues to operate normally (block 1016). For example, the managed virtual machine 108*a* boot sector 402, which has been modified by the Management Agent 504, is set to point the boot pointer 404 to the boot code 406, which preferably contains the managed virtual machine 108*a* guest operating system. Once the boot code 406 loads, the guest operating system starts running and the virtual machine 108 may execute one or more applications.

Once the managed virtual machine 108*a* is operating normally, reset the managed virtual machine 108*a* management system settings (block 1018), thereby disabling the virtual machine 108. For example, the Management Agent 504 resets the boot sector 402 so that the boot pointer 404 points to the Locator Code 508 upon the restarting of the managed virtual machine 108*a*. The method of closing down the managed virtual machine 108*a* does not affect whether the boot sector 402 is reset because the Management Agent 504 preferably resets the boot sector 402 shortly after the managed virtual machine 108*a* is running normally.

At some point, the virtual machine 108 may shut down (block 1020). For example, the user 114 may end the managed virtual machine 108*a* session by closing down the managed virtual machine 108*a*. The boot process 1002 may be restarted at block 1004 after the managed virtual machine 108*a* shuts down. The boot process 1002 is not affected by whether the managed virtual machine 108*a* is an original version of the managed virtual machine 108*a* or an unauthorized copy of the managed virtual machine 108*a*. The registration process 1000 need not be repeated for each individual virtual machine.

If the management system determines that no management layer is present (block 1008) or that the managed virtual machine 108*a* is attempting to operate in an unauthorized environment (block 1010), the managed virtual machine 108*a* remains in the disabled state resulting from registration with the management system (block 1004) or resetting the virtual machine at the end of a boot sequence (block 1020). In one example, there is no Management Agent 504 to set the boot pointer 404 to the virtual machine's 108 boot code 406. In an unmanaged host environment, there is no Management Agent 504. The missing Management Agent 504, and resulting failure to set the boot pointer 404 to the virtual machine's 108 boot code 406 implicitly determines that the environment is unauthorized. In another example, in a managed host environment that is an unauthorized environment, the Virtual Machine Management Layer 502 preferably causes the Management Agent 504 to not set the boot pointer 404 to the virtual machine's 108 boot code 406.

If the managed virtual machine 108*a* receives a boot request and remains disabled because it either lacks a management layer (block 1008) or is operating in an unauthorized environment (1010), the host physical machine 104 submits a start request to the managed virtual machine 108 (block 1022). For example, the host physical machine 104 requests the managed virtual machine 108*a* to start by loading the standard boot sector 402 address.

Once the host physical machine 104 submits a start request to the managed virtual machine 108*a*, initiate the location information gathering function (block 1024). For example, the Management Agent 504 has not set the boot pointer 404 to the virtual machine's 108 boot code 406, so the boot pointer 404 points to the Locator Code 508 in the SMP 506, and the Locator Code 508 loads and executes. FIG. 7 is a block diagram of an example managed virtual machine 108*a* in an unauthorized environment, which illustrates the boot pointer 404 pointing to the Locator Code 508. The managed virtual machine 108*a* will not operate normally by loading the boot code 406, rather, it will load the Locator Code 508.

Then, gather information indicative of location of unauthorized use (block 1026). For example, the Locator Code 508 gathers information about the unauthorized environment such as IP address and other host information. FIG. 8. further illustrates an example virtual machine 108 after the virtual machine 108 is registered with a management system, with the Locator Code 508 gathering information.

Then, transmit information associated with unauthorized environment (block 1028). For example, the Locator Code 508 transmits a message to the managed virtual machine 108*a* owner notifying the owner of the unauthorized use with the associated location information about the unauthorized environment to the owner. FIG. 8. further illustrates an example virtual machine 108 after the virtual machine 108 is registered with a management system, with the Locator Code 508 notifying an owner of unauthorized use with unauthorized environment information.

Once the information associated with the unauthorized environment is gathered and transmitted, shut down the managed virtual machine 108*a* (block 1030). For example, the Locator Code 508 shuts down the managed virtual machine 108*a* after the owner has been notified of the unauthorized use. FIG. 8. further illustrates an example virtual machine 108 after the virtual machine 108 is registered with a management system, with the Locator Code 508 shutting down the managed virtual machine 108*a*. The boot process 1002 may not be restarted after the managed virtual machine 108*a* shuts down. The boot process 1002 for a managed virtual machine 108*a* attempting to operate in an unauthorized environment may be changed so the virtual machine 108 will not operate normally, whether the managed virtual machine 108*a* is an original version of the managed virtual machine 108*a* or an unauthorized copy of the managed virtual machine 108*a*.

In summary, persons of ordinary skill in the art will readily appreciate that methods and apparatus of locating an unauthorized use of a virtual machine have been described. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for detecting an unauthorized use of a virtual machine, the method comprising:

storing a virtual machine on a physical machine at a first time, the virtual machine including a boot pointer, the boot pointer pointing to a locator code;

booting the virtual machine at a second time after the first time;

bypassing the locator code, at a third time after the second time, by adjusting the boot pointer to point from the locator code to a boot code of the virtual machine if the virtual machine is in an authorized environment, which exists when the physical machine and the virtual machine are both registered with a management system and associated with each other by the management system, which manages at least one physical machine and at least one virtual machine; and executing the locator code, at a fourth time after the second time, if the virtual machine is in an unauthorized environment, which exists when the virtual machine is not in an authorized environment, wherein the locator code gathers information indicative of a location of the unauthorized environment, and transmits a message including the information indicative of the location.

2. The method of claim 1, wherein the physical machine includes a management layer, wherein the management layer determines whether to enable the virtual machine in response to a request to start the virtual machine.

3. The method of claim 1, wherein the physical machine includes a virtualization subsystem, the virtualization subsystem supporting a plurality of virtual machines.

4. The method of claim 1, wherein the physical machine includes a management agent, wherein the management agent adjusts the boot pointer of the virtual machine.

5. The method of claim 1, wherein the authorized environment includes a first managed physical machine, which is registered with the management system, and a first managed virtual machine, which is registered with the management system.

6. The method of claim 5, wherein the first managed physical machine and the first managed virtual machine are associated with each other to create the authorized environment.

7. The method of claim 1, wherein the unauthorized environment includes a first managed physical machine, which is registered with the management system, and first unmanaged virtual machine, which is not registered with the management system.

8. The method of claim 1, wherein the unauthorized environment includes a first unmanaged physical machine, which is not registered with the management system, and a managed virtual machine, which is registered with the management system.

9. The method of claim 1, wherein the unauthorized environment includes a first managed physical machine, which is registered with the management system, and a first managed virtual machine, which is registered with the management system, wherein the first managed physical machine and the first managed virtual machine are not associated with each other to create the authorized environment.

10. The method of claim 1, wherein the information indicative of the location of the unauthorized environment includes an IP address associated with the physical machine.

11. The method of claim 1, wherein the message including the information indicative of the location is transmitted via an internet.

12. The method of claim 1, wherein the virtual machine shuts down after the message including the information indicative of the location has been transmitted.

13. An apparatus for detecting an unauthorized use of a virtual machine, the apparatus comprising:
a physical machine;
the physical machine storing a virtual machine;
at least one of the physical machine and the virtual machine storing a software program to cause the virtual machine to:
point a boot pointer of the virtual machine to a locator code at a first time;
boot the virtual machine at a second time after the first time;
bypass the locator code, at a third time after the second time, by adjusting the boot pointer from pointing to the locator code to point to a boot code of the virtual machine if the virtual machine is in an authorized environment, which exists when the physical machine and the virtual machine are both registered with a management system and associated with each other by the management system, which manages at least one physical machine and at least one virtual machine; and
execute the locator code, at a fourth time after the second time, if the virtual machine is in an unauthorized environment, which exists when the virtual machine is not in an authorized environment, wherein the locator code gathers information indicative of a location of the unauthorized environment, and transmits a message including the information indicative of the location.

14. A non-transitory computer readable media storing software instructions to detect an unauthorized use of a virtual machine, the software instructions causing a computing device to:
store a virtual machine on a physical machine at a first time, the virtual machine including a boot pointer;
point the boot pointer to a locator code;
boot the virtual machine at a second time after the first time;
bypass the locator code, at a third time after the second time, by adjusting the boot pointer from pointing to the locator code to point to a boot code of the virtual machine if the virtual machine is in an authorized environment, which exists when the physical machine and the virtual machine are both registered with a management system and associated with each other by the management system, which manages at least one physical machine and at least one virtual machine; and
execute the locator code, at a fourth time after the second time, if the virtual machine is in an unauthorized environment, which exists when the virtual machine is not in an authorized environment, wherein the locator code gathers information indicative of a location of the unauthorized environment, and transmits a message including the information indicative of the location.

\* \* \* \* \*